Dec. 7, 1948.  L. F. CURTIS  2,455,740
MAGNETOSTRICTIVE TIME-DELAY DEVICE
Filed Nov. 12, 1947  2 Sheets-Sheet 1
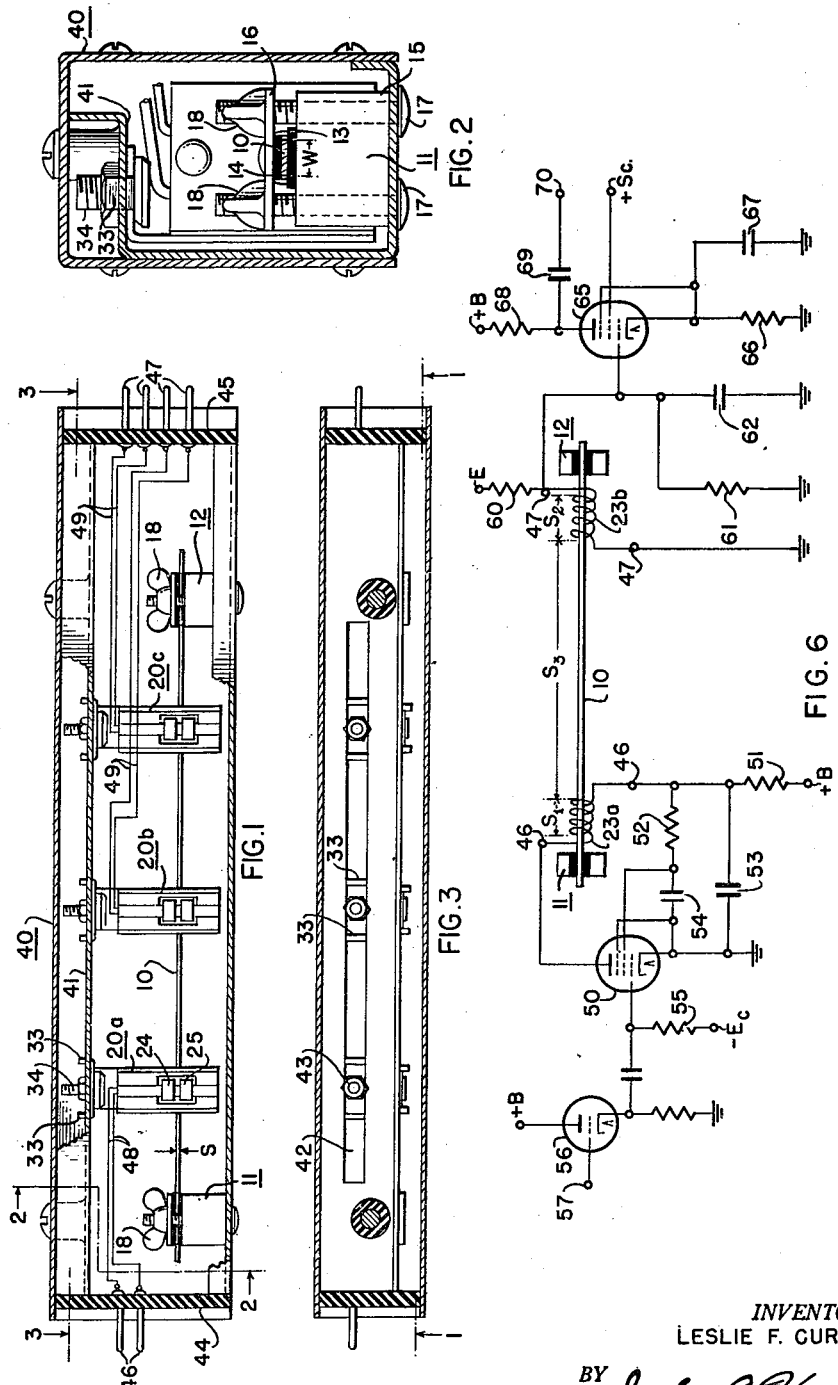
INVENTOR.
LESLIE F. CURTIS
BY John A. Harvey
ATTORNEY Dec. 7, 1948.                L. F. CURTIS                2,455,740
                    MAGNETOSTRICTIVE TIME-DELAY DEVICE
Filed Nov. 12, 1947                              2 Sheets-Sheet 2
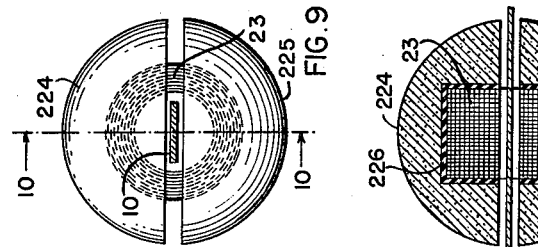
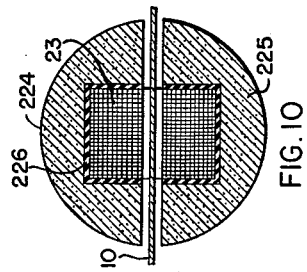
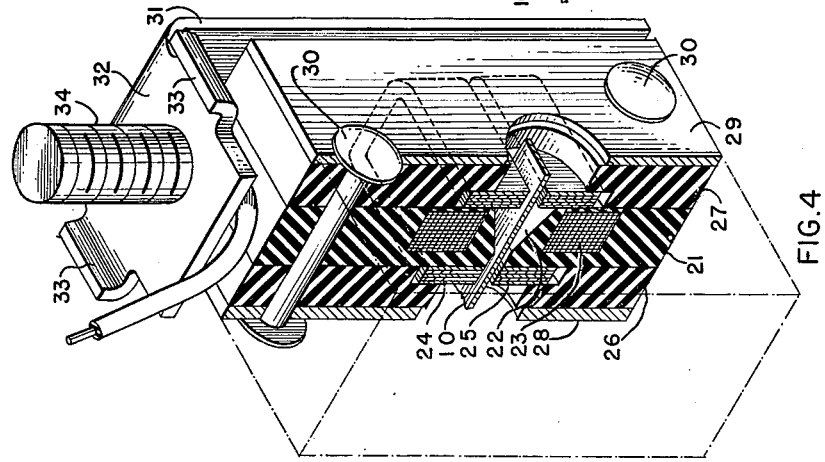
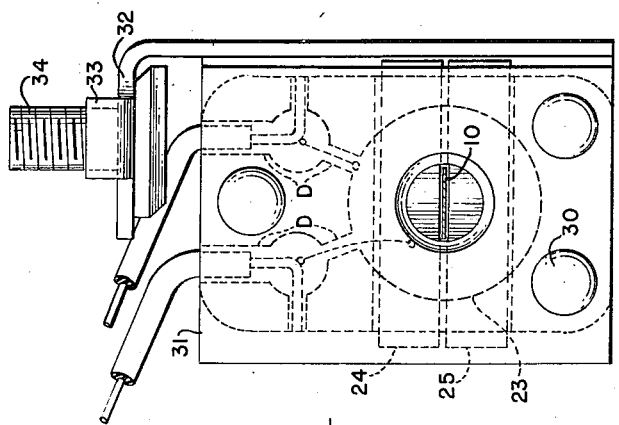
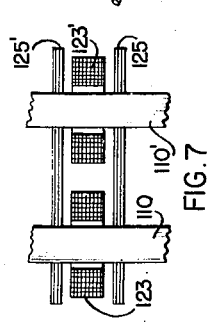
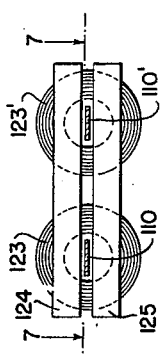
INVENTOR.
LESLIE F. CURTIS
BY
ATTORNEY Patented Dec. 7, 1948

2,455,740

UNITED STATES PATENT OFFICE 2,455,740

MAGNETOSTRICTIVE TIME-DELAY DEVICE

Leslie F. Curtis, Haydenville, Mass., assignor to Hazeltine Research, Inc., Chicago, Ill., a corporation of Illinois Application November 12, 1947, Serial No. 785,425

16 Claims. (Cl. 178—44)

This invention is directed to magnetostrictive devices for translating wave signals with a precisely selected time delay. While it may be used in translating applied signals of a variety of wave forms, including sinusoidal signals, it is especially useful for translating pulse signals with a selected time delay and will be particularly described in that connection.

Many electrical systems are known in which it is necessary to effect an accurate delay in the translation of pulse signals. For example, in navigating and distance-measuring systems elapsed times, from which the desired information may be calculated, are readily determined through the use of time-delay arrangements exhibiting a known delay characteristic. The present invention is applicable to those systems and to numerous others wherein it is desired to delay pulse or other types of signals.

A prior magnetostrictive time-delay apparatus comprises a rod of magnetostrictive material having a transmitting coil magnetically coupled to one portion of the rod and a receiving coil magnetically coupled to another portion suitably spaced from the transmitting coil. Permanent magnets of a generally U-shaped configuration are bridged across each of the transmitting and receiving coils to introduce polarizing magnetization to the associated portions of the rod and enhance its magnetostrictive conversion properties. Magnetic shields enclose each coil to reduce direct magnetic coupling therebetween and to protect each coil from the influence of stray magnetic fields. In operation, a pulse of exciting current is supplied to the transmitting coil and produces a mechanical or stress wave in the rod which is propagated in both directions therealong. As the stress wave passes along the portion of the rod with which the receiving coil is coupled, it is reconverted through magnetostrictive action into an induced electrical signal which may be derived from the receiving coil. The time delay of the induced signal relative to the exciting pulse is determined by the velocity of propagation of the stress wave in the rod and the separation of the transmitting and receiving coils. Since the velocity of propagation is relatively slow, such apparatus when designed for a given time delay is less bulky and expensive than the equivalent electrical time-delay networks otherwise used to effect a delay in signal translation.

This makes the magnetostrictive type of time-delay device appear attractive but arrangements of that type, as previously known and constructed, do not satisfy critical requirements necessary for best response. It is found that the magnetic-field coupling of both the transmitting and receiving coils should, for optimum operating conditions, be closely confined to sections of the magnetostrictive element which have carefully selected lengths related in a particular manner to one another and to the duration of the exciting pulse. Magnetostrictive time-delay devices heretofore proposed fail in this respect because no low reluctance return flux paths are provided for the coils accurately to confine their magnetizing effects to critically selected lengths of the magnetostrictive rod. The permanent magnets used in their construction do, of course, tend to lower the reluctance of the return flux path somewhat but they have too small an alternating-current permeability to produce the desired magnetic-field confinement and usually introduce eddy currents which are undesirable. Further, if the permanent magnets are relied upon to supply a return flux path for the coils, the additional magnetic flux produced by the latter may cause the magnets to become saturated or overloaded due to the fact that the magnets already have large permanent fluxes.

In the prior magnetostrictive time-delay device referred to, the ends of the rod of magnetostrictive material are embedded or terminated in blocks of beeswax at least partially to absorb stress waves propagated along the rod. It is the purpose of this termination to attempt to obviate reflection of the stress waves and multiple responses in the receiving coil. However, it has been determined that some significant reflection occurs at the point where the rod enters the wax so that this method of termination may not be suitable for certain installations.

Improved time-delay devices of the magnetostrictive type are described in concurrently filed applications, Serial No. 785,248, of Alan Hazeltine and Serial No. 785,313, of T. J. Fister, now abandoned, which are assigned to the same assignee as the present invention. The Hazeltine application is directed to certain critical dimensional relations of the components of such apparatus by which to obtain the strongest practical output pulse, with sharply defined edges, in response to a given excitation pulse. The Fister application discloses and claims a simplified and inexpensive construction in which the magnetostrictive element consists of a single lamination or strip of magnetostrictive material. The present invention enables a further improvement to be effected in magnetostrictive time-delay devices and may be most advantageously employed in conjunction with the teachings of the Hazeltine and Fister applications.

For convenience, the expression "magnetostrictive converter" is used hereinafter in the specification and claims to mean an element of magnetic material which exhibits the phenomenon of converting magnetic flux variations to travelling mechanical or stress waves, and vice versa.

It is an object of the present invention to provide a magnetostrictive time-delay device which avoids one or more of the aforementioned limitations of similar devices heretofore known to the art.

It is another object of the invention to provide a magnetostrictive signal-translating device having an improved coupler assembly for associating a winding with a magnetostrictive converter and for confining the magnetizing effect of the winding to a predetermined section of the converter.

It is another object of the invention to provide a magnetostrictive signal-translating device having an improved clamping or end terminating arrangement for minimizing reflection effects in the magnetostrictive converter.

It is a further object of the invention to provide a new and improved magnetostrictive time-delay signal-translating device having a converter so dimensioned as to minimize signal distortion when obtaining long time delays.

One form of magnetostrictive time-delay signal-translating device, in accordance with the invention, comprises a magnetostrictive converter including at least one strip of magnetostrictive material. A pair of clamps, each comprising resilient sound-absorbing material clamping opposite sides of the converter with a selected clamping pressure, are positioned at individual ones of two spaced points along the converter. The device also includes a first coupler assembly including an excitation winding coupled magnetically with the converter intermediate the clamps and including at least one pole shoe for confining the magnetizing effect of the winding to a first predetermined section of the converter. The device further includes a second coupler assembly positioned along the converter between the clamps but spaced from the first assembly and including an induction winding coupled magnetically with the converter and at least one pole shoe for confining the magnetizing effect of the induction winding to a second predetermined section of the converter.

In accordance with one feature of the invention, the clamps for the converter comprise strips of resilient sound-absorbing material positioned on opposite sides of the converter and co-operating adjustable pressure plates engaging the sound-absorbing strips and applying a selected uniform pressure to the converter at each clamping point.

In accordance with another feature of the invention, each coupler assembly for coupling to the converter comprises a winding supported in association with a predetermined section of the converter and effective to magnetize that section longitudinally. The converter has at least one pole shoe of magnetic material having high permeability, high resistivity to eddy currents, and substantially no residual magnetism. The pole shoe includes portions which are supported immediately adjacent the opposite ends of the winding on one side of the converter and which extend approximately to the surface thereof. This pole-shoe construction provides a low reluctance flux path for the winding comprising substantially only the aforesaid predetermined section of the converter and confines the magnetizing effect of the winding substantially to that section of the converter.

For a better understanding of the present invention, together with other and further objects thereof, reference is had to the following description taken in connection with the accompanying drawings, and its scope will be pointed out in the appended claims.

In the drawings, Fig. 1 is a side elevational view, partly broken away and partly in cross section, of a magnetostrictive time-delay device embodying the present invention in one form; Fig. 2 is a sectional view of the device of Fig. 1 taken along the section lines 2—2; Fig. 3 is another sectional view of the device of Fig. 1 taken along the sectional lines 3—3 of Fig. 1; Figs. 4 and 5 are an isometric cross-sectional view and an end view, respectively, of a coupler assembly included in the device of Fig. 1; Fig. 6 is a circuit diagram representing one manner of connecting the device of Fig. 1 into an electrical system; Figs. 7 and 8 are fragmentary views of a modified form of magnetostrictive time-delay device embodying the invention; and Figs. 9 and 10 are fragmentary views representing still a further modification of the invention.

Referring now more particularly to Fig. 1 of the drawings, the arrangement there illustrated may be considered as one for translating applied signals of pulse wave form to derive output pulses having a precisely selected time delay relative to the applied pulses. The arrangement comprises a magnetostrictive converter 10. As earlier mentioned, this element is formed of magnetic material which converts magnetic flux variations to travelling mechanical or stress waves, and viceversa. The converter is of the flat-strip type and preferably consists of a single homogeneous elongated strip of magnetostrictive material, such as nickel or a nickel-iron alloy having strong magnetostrictive properties. However, the converter may be laminated if desired and in this event it comprises a stack of similar strips electrically insulated from one another as explained in the Hazeltine application.

In order that magnetic fluxes associated with magnetostrictive conversion shall penetrate the converter 10 so as to make full use of its cross section, the thickness S of the strip is selected to be approximately equal to twice the effective depth of magnetic-field penetration for electrical signals to be translated. The depth of penetration depends on the conductivity and permeability of the strip as well as the signal frequency and may be computed in accordance with well-known formulas. The permeability here referred to is the alternating-current or reversible permeability, rather than the direct-current permeability, and the effective frequency for pulse translation may be taken as that corresponding to a period equal to twice the pulse width or duration.

The width of the strip 10, indicated by dimension line W in Fig. 2, is large compared to its thickness to facilitate handling and is not critical for short time delays. The influence of the width on signal distortion when long time delays are desired will be considered hereinafter. The length of the strip is not critical and is selected in accordance with the maximum time delay to be obtained from the device.

The converter is principally supported by a pair of clamps 11 and 12, constructed to suppress to a tolerable value end reflections of the mechanical or stress waves propagated therealong. The clamps are identical and engage the converter 10 at two spaced points close to the ends thereof to have as much of the converter as possible free for utilization in signal translation. As indicated in Fig. 2, each clamp comprises a pair of strips 13 and 14 of resilient sound-absorbing material, such as felt or neoprene, positioned on opposite sides of the converter 10. The strip 13 is shown somewhat wider than the converter but strip 14 is approximately the same width as the converter. Co-operating adjustable pressure plates, shown as a base plate 15 and a movable top plate 16, clamp the converter between the sound-absorbing strips 13 and 14. The top pressure plate 16 is apertured to receive screws 17, 17 which also extend through the base plate 15. Winged nuts 18, 18 thread onto the screws 17, 17 and permit the clamping pressure to be adjusted as desired.

A plurality of coupler assemblies 20a, 20b, and 20c are included in the translating device intermediate the clamps 11 and 12. These assemblies have the same construction and will be described with particular reference to Figs. 4 and 5. Each assembly includes a coil supporting member 21 of insulating material having a transversely extending, tapered or bell-shaped centrally disposed aperture 22 through which the converter 10 projects. Member 21 also has a recess for receiving a winding and for supporting the winding in association with a predetermined section of the converter 10. More specifically, the winding recess is circular and is concentric with the aperture 22 so that a universal-wound winding 23 received thereby encloses a particular portion of the converter 10. At least one, but preferably two, pole shoes 24 and 25 of magnetic material having high permeability, high resistivity to eddy currents, and substantially no residual magnetism are included within the coupler assembly. As shown in Fig. 4, each pole shoe includes portions positioned on opposite sides of the winding supporting member 21 in overlapping relation with the winding recess thereof so as to be immediately adjacent the opposite ends of the winding 23 on one side of the converter 10. These portions of the pole shoe are of such width that when the converter 10 is in position within the assembly they extend approximately to the surface of the converter. With such a construction, the pole shoes provide low reluctance return flux paths for the winding 23 comprising substantially only that section of the converter 10 which is within the longitudinal space defined by the pole shoes. The longitudinal magnetizing effect of the winding 23 is thus limited to that particular limited section of the converter 10.

Each pole shoe 24 is formed of flat loops or coils of a magnetic material, placed around the upper half of winding 23 in a plane parallel to that of the converter 10. The pole shoe then provides a closed magnetic flux path surrounding the winding. The pole shoe 25 is of identical construction and encloses the lower half of the winding 23. Together these shoes define a small gap or slot through which the converter 10 extends. Centrally apertured insulating members 26, 27 are positioned on opposite sides of the winding supporting member 21 and are provided with suitable channels by which to retain the pole shoes in proper orientation relative to the winding 23 and in proper position to define the desired gap or slot for the converter 10. Centrally apertured conductive shield plates 28 and 29 are placed on opposite sides of the support members 26 and 27 further to confine the alternating magnetic fluxes. The bell-shaped aperture 22 of the winding supporting member 21 guides the converter and facilitates threading it through the coupler during assembly. Rivets 30, 30 secure the several components in assembled relation. Suitable ducts D, D are provided in the member 21 of the coupler assembly, as shown in Fig. 5, to permit connections to be made to the enclosed winding 23. The described assembly is suitably secured to a mounting plate 31 which has a horizontal flange 32 carrying guide tabs 33, 33 and a threaded stud 34.

The pole shoes have been described as having "substantially no residual magnetism" which is intended to mean that the pole shoes themselves are not magnets. Further, they are said to be supported "immediately adjacent the opposite ends of the winding" by which is meant that the shoes are as close to the ends of the windings as the physical considerations permit. Thus if insulating washers or the like are interposed between the shoes and winding, the washers preferably are formed of quite thin insulating material.

The converter 10 with its clamps 11, 12 and coupler assemblies 20a, 20b, and 20c is enclosed within a magnetic-shield structure or housing 40. The screws 17 of the clamps extend through and secure the clamps to the base portion of that structure. A horizontal partition 41 is supported within the structure and is longitudinally slotted, as indicated at 42 in Fig. 3, to receive the guide tabs 33, 33 of the coupler assemblies and orient the couplers properly in relation to the converter 10. Lock nuts 43 hold these couplers in adjustably fixed positions along the slot 42 of the partition 41. The end plates 44 and 45 of the housing 40 are made of insulating material and individually support a pair of input terminals 46, 46 and a plurality of pairs of output terminals 47, 47. Conductors 48, connected with the coupler 20a, extend in one direction through the shield housing to the input terminals 46, 46 and pairs of conductors 49, 49 extend in the opposite direction from the remaining coupler assemblies to connect with individual pairs of the output terminals 47, 47. This arrangement of the input and output conductors reduces electrostatic coupling without the necessity of additional shielding of the conductors. The cover portion of the shield container 40 is separable from its base so that any adjustment or rearrangement of the components within the shielding container may be made.

While the signal-translating device is represented in Fig. 1 as having an input coupler 20a and two output couplers 20b and 20c, it is convenient to consider only the input coupler 20a and a single output coupler 20b in describing the manner of connecting such a device into an electrical system. Thus, in Fig. 6 the winding 23a is the excitation winding included in the coupler 20a and the winding 23b is an induction winding included in the coupler 20b. A pulse-translating circuit comprising a pentode vacuum tube 50, constitutes means for supplying pulses of exciting current to the excitation winding 23a. The cathode of tube 50 is grounded and its anode is connected through the excitation winding 23a and a decoupling resistor 51 to a source of space current, indicated as +B. The suppressor electrode of the tube 50 is directly connected with its cathode and the screen electrode is connected through a potential-dropping resistor 52 and the resistor 51 to the source +B. Condensers 53 and 54 are by-pass condensers for further decoupling the anode and screen electrodes, respectively, from the source +B. A bias source —Ec is coupled to the control electrode of the tube 50 through a grid resistor 55 and maintains the tube near or below anode-current cut-off in the absence of applied signals. The direct-current component of the anode-current pulses of this tube traverses the excitation winding 23a and is usually sufficient to establish a polarizing magnetic flux in the section $S_1$ of the converter 10 which is subject to the magnetizing effect of that winding. If desired, an additional component of direct current may be supplied to this winding for polarizing purposes and may be obtained by selecting the value of the biasing source —Ec to have tube 50 normally slightly conductive. A conventional cathode-follower circuit, including a triode vacuum tube 56, provides means for supplying a signal of pulse wave form applied to an input terminal 57 to the input electrodes of the tube 50.

At the output coupler, the induction winding 23b is associated with means for establishing a polarizing magnetic flux in the section $S_2$ of the converter 10 which is subject to the magnetizing effect of that winding. This polarizing means is shown as including a source of unidirectional potential, indicated as E, and a resistor 60 connected in a direct-current circuit with the induction winding 23b. A wave-shaping network, provided by a damping resistor 61 and a parallel-connected condenser 62, is connected across the induction winding 23b to reduce the amplitude of electrical oscillations or ringing effects in that winding. The input electrodes of a wave-signal repeater, including a pentode vacuum tube 65, are connected across the induction winding 23b so that this repeater constitutes means coupled to the winding for supplying the induced signals to a utilizing device. The cathode of the tube 65 is grounded through a resistor 66 by-passed by a condenser 67. The anode of the tube 65 is coupled to a source of space current +B through an anode load resistor 68, and a condenser 69 couples an output terminal 70 to the anode circuit of the tube.

In the operation of the described signal-translating device, a signal of pulse wave form is applied to the input terminal 57 with such polarity as to be translated by the tube 50 to apply corresponding pulses of exciting current to the excitation winding 23a of the input coupler 20a. The flow of exciting current through the winding 23a varies the flux in the section $S_1$ of the converter 10 and establishes in that section a longitudinal mechanical stress, such as a contraction. This stress creates two similar longitudinal stress waves or mechanical wave pulses which travel in opposite directions along the longitudinal axis of the converter at the velocity of stress-wave propagation exhibited by the magnetostrictive material of the converter. With usual magnetostrictive materials, this velocity is the order of 4500 meters per second.

The stress wave travelling in the direction of the end clamp 11 is effectively suppressed at the clamp and is not used. The stress wave which travels in the direction of the induction winding 23b of the output coupler assembly 20b is the useful one and its leading edge arrives at the section $S_2$ of the converter 10 in a time determined by the distance $S_3$ between the converter sections $S_1$ and $S_2$. This time determines the delay of the response of the induction winding 23b to the pulse of exciting current applied to the excitation winding 23a. It is found that the value of velocity of propagation given above results in convenient dimensions of the converter 10 for pulse widths of the order of one microsecond and for time delays of the order of 10 to 150 microseconds.

As the leading edge of the stress wave enters the section $S_2$ of the converter, the permeability of that section is modified and the flux established therein by the polarizing circuit is changed. This change in flux induces a first signal component in the induction winding 23b. As the trailing edge of the stress wave travels through the same section, the permeability is restored substantially to its initial condition and effects a further change in the flux established by the polarizing circuit. This change in flux is in the opposite sense to the first-mentioned change and hence a second pulse is induced in the induction winding 23b but of opposite polarity to the first-mentioned pulse. Finally, the stress wave travels beyond the induction winding 23b to the end clamp 12 where it is effectively suppressed.

The signal induced in the induction winding 23b is applied to the input electrodes of the repeater 65 and is translated to the output terminal 70. The output signal includes two components of opposite polarity and of equal pulse durations. The first results from the traverse of the leading edge of the stress wave through the local section $S_2$ of the converter and the second is produced in response to the propagation of the trailing edge of the stress wave along the same section. As described in the Hazeltine application, referred to previously, the sections $S_1$ and $S_2$ of the converter are preferably of equal lengths and individually represent a stress-wave propagation time which is equal to the duration of the exciting pulse. Where such conditions are satisfied, the output signal supplied to the output terminal 70 has the greatest amplitude and the sharpest edges obtainable in response to a particular excitation pulse supplied to the excitation winding 23a. Such conditions are readily realizable with the described coupler assemblies because the pole shoes 24 and 25 of each assembly confine the magnetizing effect of the winding of each such coupler to only that portion of the converter which is within the space defined by the opposite sides of each pole piece. Appropriate selection of the dimensions of the components of each coupler assembly ensures that the sections $S_1$ and $S_2$ of the converter have the required lengths relative to one another and to the duration of the applied exciting pulse.

The coupler assemblies described have the additional advantage of eliminating substantially all direct coupling between the excitation winding 23a and the induction winding or windings which may be spaced therefrom along the converter. As a consequence, each induction winding is responsive primarily only to the propagation of the stress wave along that particular portion of the converter which is subject to the magnetizing effect of each such induction winding. This is extremely helpful in preserving the desired wave form of the output pulses.

Where the time-delay device is to be employed for translating signal pulses having a duration of the order of one microsecond, the converter 10 may have a thickness within the range 0.001 inch to 0.005 inch and the section or length of the converter included within the field of the winding of each coupler may be approximately 0.125 inch. Each winding 23 may consist of approximately 100 turns of No. 38 S. S. E. (single-silk-enamel) wire, or alternatively may consist of approximately 170 turns of No. 40 S. S. E. wire, and may have a width of $\frac{3}{32}$ inch and an outside diameter of $\frac{3}{8}$ inch. The laminated pole shoes 24 and 25 may be $\frac{1}{32}$ inch thick and wound from 0.003 inch by $\frac{1}{8}$ inch flat loops with $\frac{1}{8}$ inch openings for receiving the winding 23. The pole-shoe spacing provided to accommodate the converter 10 should preferably provide a gap not exceeding 0.002 inch from either side of the converter 10 to its adjacent pole shoe 24 or 25. For the specific dimensions last described, the resilient strips 13 and 14 of each clamp 11 and 12 may be $\frac{1}{16}$ inch neoprene strips and the clamping area may extend for a distance of approximately 1 inch along the converter 10. The reflected stress wave in the converter will then usually have a value of at least 20 or 30 decibels less than direct stress waves.

It is found that where the delay time to be realized in the device is within a range extending up to approximately 40 or 50 microseconds, the width W of the converter 10 may be approximately $\frac{1}{8}$ inch; that is, the width of the converter may, for short time delays, be equal to the length of the section of the converter which is subject to the magnetizing effect of the winding 23 of any coupler. However, the shape and amplitude of the output pulse tend to deteriorate when appreciably greater time delays are to be obtained with a converter of that width. It is believed that the reason for this is that the high-frequency components of the stress waves may have a slower velocity in the converter than the low-frequency components and the accumulative effect over a long length of converter strip manifests itself in deterioration of the output pulse. Such deterioration may be minimized by utilizing a converter having a width substantially less than the length of the converter section which is subject to the magnetizing effect of the windings of the several couplers. Where the converter width is approximately one-half the length of the section associated with each coupler, the distortion due to the variation of velocity of propagation with frequency is not serious for time delays as great as 150 microseconds. Therefore, in the specific embodiment referred to previously, the converter 10 may be a single strip of magnetostrictive material $\frac{1}{16}$ inch in width or it may be replaced by two $\frac{1}{16}$ inch strips arranged side by side.

Fig. 7 is a fragmentary plan view in cross section of a time-delay device similar to that of Fig. 1, but including two magnetostrictive converters 110 and 110'. In this embodiment, each coupler assembly includes a pair of similar windings 123 and 123' individually enclosing a section of one of the converter strips 110 and 110'. The windings are included in the same electrical circuit either in series or parallel and are arranged so that their fluxes are in series-aiding relation. Fig. 8 is a cross-sectional view of this modified form of the invention. As indicated in Fig. 8, the laminated pole shoes 124 and 125 are positioned on opposite sides of the converter strips and may be laminated coils to enclose the upper and lower portions, respectively, of the windings 123 and 123'. However, as indicated in Fig. 7, each pole shoe may comprise two strips 125 and 125' of magnetic material, extending across the converters close to the edges of the windings. The time-delay device of this modification operates in a manner which is generally similar to that described in connection with the device of Fig. 1, except that the strips 110 and 110' are simultaneously excited by the windings 123 and 123' of the input coupler assembly and the output pulses obtained from each strip may be combined in a single output circuit.

As already pointed out, the function of the pole shoes included in the coupler assemblies is to provide low reluctance flux paths for the windings of such assemblies to confine the magnetizing effect of the windings to critically selected section lengths of the converter. While laminated pole-shoe structures have been described thus far, pole shoes of comminuted or powdered iron are also suitable, as indicated in the modification of Figs. 9 and 10. In this modification, the pole shoes 224 and 225 are hemispherical in configuration and may be molded from a conventional mixture of powdered iron and a suitable dielectric binder. Each pole shoe has a recess for receiving one-half of the winding 23 and the winding may, if desired, be insulated from the pole shoe by mica strips or washers 226.

While the converter 10 has been illustrated as a linear element, it may be curved if desired. Also, the converter in practice may rest against either pole shoe of the coupler assemblies but the gap between the pole shoes should be slightly greater than the thickness of the converter to enable rapid and convenient adjustment of the time delay by suitably adjusting the spacing between the input and output couplers.

Magnetostrictive time-delay signal-translating devices constructed in accordance with this invention translate with very precisely controlled time delays signals of a variety of wave forms and especially signals of pulse wave form. The individual coupler assemblies are readily adjustable along the length of the converter accurately to achieve a preselected delay in signal translation. The magnetic shielding provided by the described construction of the coupler assemblies enables several output couplers to be associated with the converter without interference or interaction, and output signals may be obtained from all or from only selected ones of the output couplers.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A time-delay signal-translating device of the magnetostrictive type comprising: a magnetostrictive converter including at least one strip of magnetostrictive material; a pair of clamps, each comprising resilient sound-absorbing material clamping opposite sides of said converter with a selected clamping pressure, positioned at individual ones of two spaced points along said converter; a first coupler assembly including an excitation winding coupled magnetically with said converter intermediate said clamps and including at least one pole shoe for limiting the magnetizing effect of said winding to a first predetermined section of said converter; and a second coupler assembly positioned along said converter between said clamps but spaced from said first assembly and including an induction winding coupled magnetically with said converter and at least one pole shoe for limiting the magnetizing effect of said induction winding to a second predetermined section of said converter.

2. A time-delay signal-translating device of the magnetostrictive type comprising: a magnetostrictive converter; a first coupler assembly including an excitation winding coupled magnetically with said converter and at least one pole shoe for limiting the magnetizing effect of said winding to a first predetermined section of said converter; at least one additional coupler assembly spaced from said first assembly along said converter and including an induction winding coupled magnetically with said converter and at least one pole shoe for limiting the magnetizing effect of said induction winding to a second predetermined section of said converter; a magnetic-shield structure housing said converter and said coupler assemblies; an input conductor extending in one direction from said excitation winding to one end of said structure; and an output conductor extending in the opposite direction from said induction winding to the other end of said structure.

3. A time-delay device of the magnetostrictive type comprising: a magnetostrictive converter including at least one strip of magnetostrictive material; a pair of clamps engaging said converter at two spaced points thereof, each of said clamps comprising resilient sound-absorbing material positioned on opposite sides of said converter and co-operating adjustable pressure plates engaging said sound-absorbing material; a first coupler assembly including an excitation winding coupled magnetically with a first section of said converter intermediate said clamps and responsive to an applied signal to establish in said section a stress wave for propagation along said converter; and at least one additional coupler assembly spaced from said first assembly along said converter and including an induction winding coupled magnetically with a second section of said converter intermediate said clamps and responsive to the propagation of said stress wave therealong to derive an induced signal delayed relative to the application of an exciting signal to said excitation winding.

4. A time-delay device of the magnetostrictive type for translating a pulse signal comprising: a magnetostrictive converter including at least one strip of magnetostrictive material having a width substantially less than the length of a predetermined section of said converter representing a stress-wave propagation time approximately equal to the duration of said pulse; a first coupler assembly including an excitation winding coupled magnetically with said predetermined section of said converter and responsive to said pulse to establish in said section a stress wave for propagation along said converter; and at least one additional coupler assembly spaced from said first assembly along said converter and including an induction winding coupled magnetically with a second section of said converter and responsive to the propagation of said stress wave therealong to derive an induced signal delayed relative to the application of said pulse to said excitation winding.

5. A time-delay device of the magnetostrictive type for translating a pulse signal comprising: a magnetostrictive converter including at least one strip of magnetostrictive material having a width approximately equal to one-half the length of a predetermined section of said converter representing a stress-wave propagation time approximately equal to the duration of said pulse; a first coupler assembly including an excitation winding coupled magnetically with said predetermined section of said converter and responsive to said pulse to establish in said section a stress wave for propagation along said converter; and at least one additional coupler assembly spaced from said first assembly along said converter and including an induction winding coupled magnetically with a second section of said converter and responsive to the propagation of said stress wave therealong to derive an induced signal delayed relative to the application of said pulse to said excitation winding.

6. A time-delay device of the magnetostrictive type for translating pulse signals having a duration of the order of one microsecond comprising: a magnetostrictive converter including at least one strip of magnetostrictive material having a width not exceeding approximately $\frac{1}{16}$ inch; a first coupler assembly including an excitation winding coupled magnetically with a first section of said converter having a length equal approximately to $\frac{1}{8}$ inch and responsive to an applied pulse to establish in said section a stress wave for propagation along said converter; and at least one additional coupler assembly spaced from said first assembly along said converter and including an induction winding coupled magnetically with a second section of said converter of approximately the same length as said first section and responsive to the propagation of said stress wave therealong to derive an induced signal delay relative to the application of an exciting signal to said excitation winding.

7. In a time-delay signal-translating device including a magnetostrictive converter, a coupler assembly for coupling to said converter comprising: a winding supported in association with a predetermined section of said converter and effective to magnetize said section longitudinally; and at least one pole shoe of magnetic material having high permeability, high resistivity to eddy currents and substantially no residual magnetization, said pole shoe including portions which are supported immediately adjacent the opposite ends of said winding on one side of said converter and which extend approximately to the surface of said converter, thereby to provide a low reluctance flux path for said winding comprising substantially only said predetermined section of said converter and to confine the magnetizing effect of said winding substantially to said section of said converter.

8. In a time-delay signal-translating device including a magnetostrictive converter, a coupler assembly for coupling to said converter comprising: a winding supported to enclose a predetermined section of said converter and effective to magnetize said section longitudinally; and at least one pole shoe of magnetic material having high permeability, high resistivity to eddy currents and substantially no residual magnetization, said pole shoe including portions which are supported immediately adjacent the opposite ends of said winding on one side of said converter and which extend approximately to the surface of said converter, thereby to provide a low reluctance flux path for said winding comprising substantially only said predetermined section of said converter and to confine the magnetizing effect of said winding substantially to said enclosed section of said converter.

9. In a time-delay signal-translating device including a magnetostrictive converter, a coupler assembly for coupling to said converter comprising: a winding supported in association with a predetermined section of said converter and effective to magnetize said section longitudinally; and a pair of pole shoes positioned on opposite sides of said converter and constructed of magnetic material having high permeability, high resistivity to eddy currents and substantially no residual magnetization, said pole shoes each including portions which are supported immediately adjacent the opposite ends of said winding on one side of said converter and which extend approximately to the surface of said converter, thereby to provide low reluctance flux paths for said winding comprising substantially only said predetermined section of said converter and to confine the magnetizing effect of said winding substantially to said section of said converter.

10. In a time-delay signal-translating device including a magnetostrictive converter, a coupler assembly for coupling to said converter comprising: a winding supported to enclose a predetermined section of said converter and effective to magnetize said section longitudinally, and at least one pole shoe of magnetic material having high permeability, high resistivity to eddy currents and substantially no residual magnetization, said pole shoe including portions which constitute a closed magnetic circuit supported on one side of said converter to enclose a part of said winding and present magnetic circuit portions immediately adjacent the opposite ends of said winding and extending approximately to the surface of said converter, thereby to provide a low reluctance flux path for said winding comprising substantially only said predetermined section of said converter and to confine the magnetizing effect of said winding substantially to said enclosed section of said converter.

11. In a time-delay signal-translating device including a flat-strip type of magnetostrictive converter, a coupler assembly for coupling to said converter comprising: a winding supported to enclose a predetermined section of said converter and effective to magnetize said section longitudinally; and at least one pole shoe of magnetic material having high permeability, high resistivity to eddy currents and substantially no residual magnetization, said pole shoe including portions which constitute a closed magnetic circuit supported in a plane parallel to that of said converter to enclose a part of said winding and present magnetic circuit portions immediately adjacent the opposite ends of said winding and extending approximately to the surface of said converter, thereby to provide a low reluctance flux path for said winding comprising substantially only said predetermined section of said converter and to confine the magnetizing effect of said winding substantially to said enclosed section of said converter.

12. In a time-delay signal-translating device including a flat-strip type of magnetostrictive converter, a coupler assembly for coupling to said converter comprising: a winding supported to enclose a predetermined section of said converter and effective to magnetize said section longitudinally; and at least one pole shoe of magnetic material having high permeability, high resistivity to eddy currents and substantially no residual magnetization, said pole shoe comprising a laminated structure supported in a plane parallel to that of said converter to present magnetic circuit portions immediately adjacent the opposite ends of said winding and extending approximately to the surface of said converter, thereby to provide a low reluctance flux path for said winding comprising substantially only said predetermined section of said converter and to confine the magnetizing effect of said winding substantially to said enclosed section of said converter.

13. In a time-delay signal-translating device including a flat-strip type of magnetostrictive converter, a coupler assembly for coupling to said converter comprising: a winding supported to enclose a predetermined section of said converter and effective to magnetize said section longitudinally; and a pair of pole shoes positioned on opposite sides of said converter and constructed and magnetic material having high permeability, high resistivity to eddy currents and substantially no residual magnetization; said pole shoes each comprising a laminated coil structure supported in a plane parallel to that of said converter to enclose a part of said winding and present magnetic circuit portions immediately adjacent the opposite ends of said winding and extending approximately to the surface of said converter, thereby to provide low reluctance flux paths for said winding comprising substantially only said predetermined section of said converter and to confine the magnetizing effect of said winding substantially to said enclosed section of said converter.

14. In a time-delay signal-translating device including a magnetostrictive converter, a coupler assembly for coupling to said converter comprising: a supporting member of insulating material having an aperture through which said converter projects and having a winding receiving recess surrounding said aperture; a winding supported in said recess to enclose a predetermined section of said converter and effective to magnetize said section longitudinally; and at least one pole shoe of magnetic material having high permeability, high resistivity to eddy currents and substantially no residual magnetization, said pole shoe including portions which are supported immediately adjacent the opposite ends of said winding on one side of said converter and which extend approximately to the surface of said converter, thereby to provide a low reluctance flux path for said winding comprising substantially only said predetermined section of said converter and to confine the magnetizing effect of said winding substantially to said enclosed section of said converter.

15. In a time-delay signal-translating device including a magnetostrictive converter, a coupler assembly for coupling to said converter comprising: a supporting member of insulating material having a transversely extending, tapered aperture through which said converter projects and having a winding receiving recess surrounding said aperture; a winding supported in said recess to enclose a predetermined section of said converter and effective to magnetize said section longitudinally; and at least one pole shoe of magnetic material having high permeability, high resistivity to eddy currents and substantially no residual magnetization, said pole shoe including portions positioned on opposite sides of said member, overlapping said recess thereof and extending approximately to the surface of said converter, thereby to provide a low reluctance flux path for said winding comprising substantially only said predetermined section of said converter and to confine the magnetizing effect of said winding substantially to said section of said converter.

16. In a time-delay signal-translating device including a magnetostrictive converter, a coupler assembly for coupling to said converter comprising: a supporting member of insulating material having a transversely extending, tapered aperture through which said converter projects and having a winding receiving recess surrounding said aperture; a winding supported in said recess to enclose a predetermined section of said converter and effective to magnetize said section longitudinally; at last one pole shoe of magnetic material having high permeability, high resistivity to eddy currents and substantially no residual magnetization, said pole shoe including portions which are positioned on opposite sides of said member, overlapping said recess thereof and extending approximately to the surface of said converter, thereby to provide a low reluctance flux path for said winding comprising substantially only said predetermined section of said converter and to confine the magnetizing effect of said winding substantially to said section of said converter, additional insulating members positioned on opposite sides of said supporting member overlying said pole shoe and having apertures in coaxial alignment with said aperture of said supporting member and conductive shield plates apertured to receive said converter and positioned on the remote sides of said additional members.

LESLIE F. CURTIS.

No references cited.